United States Patent [19]

Irikura

[11] Patent Number: 4,483,062

[45] Date of Patent: Nov. 20, 1984

[54] METHOD FOR MANUFACTURING SOLID ELECTROLYTE CONDENSERS

[75] Inventor: Tsutomu Irikura, Joyo, Japan

[73] Assignee: Matsushita Electric Industrial Co., Ltd., Osaka, Japan

[21] Appl. No.: 394,995

[22] PCT Filed: Oct. 28, 1981

[86] PCT No.: PCT/JP81/00304

§ 371 Date: Jun. 11, 1982

§ 102(e) Date: Jun. 11, 1982

[87] PCT Pub. No.: WO82/01618

PCT Pub. Date: May 13, 1982

[30] Foreign Application Priority Data

Oct. 31, 1980 [JP] Japan .............................. 55-154252

[51] Int. Cl.³ .............................................. H01G 9/24
[52] U.S. Cl. .................................................... 29/570
[58] Field of Search ................. 29/570, 589, 590, 591; 361/433; 427/313

[56] References Cited

U.S. PATENT DOCUMENTS 3,855,505 12/1974 Karlik, Jr. et al. ............... 29/570 X

OTHER PUBLICATIONS

Conwicke, J. A. et al., "Compositions for the Selective Placement of Solders and Brazes", in *IEEE International Convention Digest*, 1971, pp. 446–447.

Primary Examiner—Brian E. Hearn
Assistant Examiner—Alan E. Schiavelli
Attorney, Agent, or Firm—Wenderoth, Lind & Ponack

[57] ABSTRACT

A method for manufacturing a solid electrolyte condenser encapsulated with an insulating resin, wherein a solder layer is partially formed on a cathode current collecting layer to be connected with a cathode terminal and the solder layer is subsequently remelted and solidified while contacted by the cathode terminal 5 to connect the cathode terminal 5 for the purpose of avoiding any possible spattering of solder of the solder layer connecting the cathode terminal to the cathode current collecting layer, any breakage or any defect in appearance.

7 Claims, 12 Drawing Figures

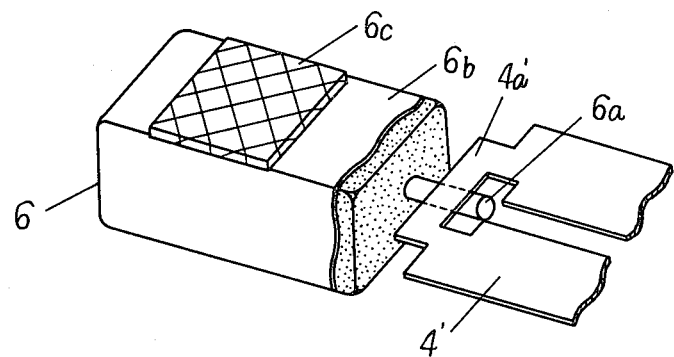

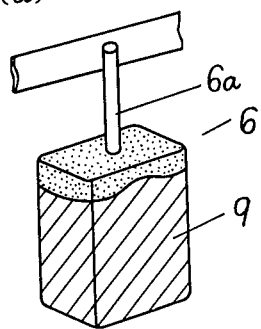
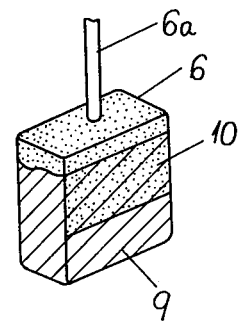
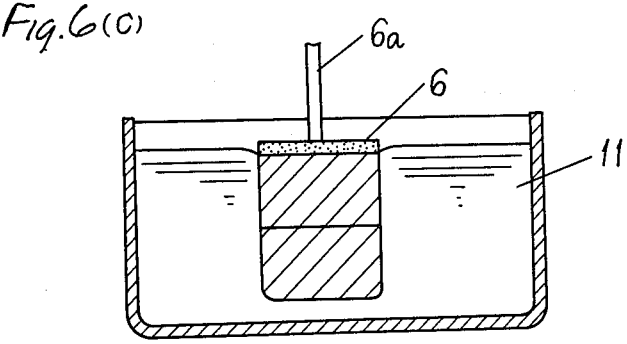
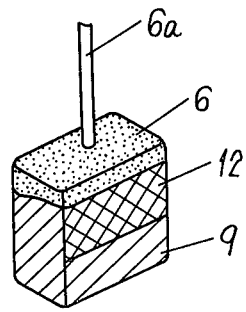

METHOD FOR MANUFACTURING SOLID ELECTROLYTE CONDENSERS

FIELD OF TECHNOLOGY

This invention relates to a method for manufacturing a solid electrolyte condenser encapsulated with an insulating resin.

BACKGROUND ART

Hitherto, this type of solid electrolyte condenser was formed by preparing a condenser element formed by sequentially depositing a layer of semiconductor metal oxide such as manganese dioxide, a cathode layer made of carbon and a cathode current collecting layer made of silver paint, on an anode of a sintered body of valve metal such as tantalum having an anode lead-out line, which is made of a valve metal such as tantalum, and also, having a surface thereof formed with a dielectric oxidizing film, and then encapsulating this condenser element with an insulating resin. From this condenser body extend an anode terminal connected to the anode lead-out line, and a cathode terminal connected to the cathode current collecting layer.

In general, a chip component such as the solid electrolyte condenser is soldered to a land on a circuit board by passing, after it has been directly placed on the circuit board, through a furnace heated to 200° to 270° C. or fixed on the circuit board by the use of a bonding agent and soldered to the land on the circuit board by dipping the whole of the chip component in a solder bath with the chip component oriented downwards, and for this reason the chip component tends to be heated to 200° to 270° C. and, therefore, must have an appropriate heat resistance.

On the other hand, in the solid electrolyte condenser, soldering is used in connecting the condenser element with the cathode terminal because of its high workability and inexpensiveness, but in view of the fact that the silver paint is used to form the cathode current collecting layer tends to erode more and more as the temperature increases, any solder having a melting point higher than 270° C. cannot be used and, therefore, a solder of about 183° to 270° C. is used.

In addition, in this type of solid electrolyte condenser, referring to FIG. 1(a), the cathode terminal is connected by dipping a condenser element 1 with the conventional cathode current collecting layer formed thereon into a flux or rosin-isopropyl alcohol type to apply a flux 2 thereto (Even though the condenser element is partially dipped into the flux, the flux adheres to the whole of the cathode current collecting layer by capillary action), then dipping it into a solder bath of about 200° to 230° C. to form a solder layer 3 on the cathode current collecting layer as shown in FIG. 1 (b), and finally dipping it again into the solder bath while the cathode terminal is connected to the solder layer 3.

However, where this type of solder is used, in view of the facts that the temperature at which soldering to the circuit board is performed is as high as 200° to 270° C. and that the whole is dipped into the solder bath, the solder inside tends to fuse and thermally expand enough to break a weak area of an encapsulating resin or to spatter outwards, resulting in breakage, resin cracking, a defect in appearance and other defects.

SUMMARY OF THE INVENTION

Accordingly, this invention is intended to provide a method for manufacturing a solid electrolyte condenser wherein the cathode terminal is connected by forming a solder layer partially on the cathode current collecting layer to be connected with the cathode terminal and then remelting and solidifying the solder layer while said cathode terminal is held in contact with the solder layer, which method is free from any possible spattering of solder and is effective to produce the condenser free from any breakage or defect in appearance.

BRIEF DESCRIPTION OF THE DRAWINGS

FIGS. 6(a) to 6(d) are diagrams showing essential steps of the manufacturing method of this invention;

BEST MODE FOR CARRYING OUT THE INVENTION

FIGS. 2 to 5 illustrate a method for manufacturing a chip-like solid electrolyte condenser according to one embodiment of this invention and, in this embodiment, lead frames are employed wherein a plurality of anode terminal pieces 4', which form an anode terminal, and a plurality of cathode terminal pieces 5' which form a cathode terminal are so arranged as to have their tips held in abutment in predetermined spaced relation.

Figure 1A:
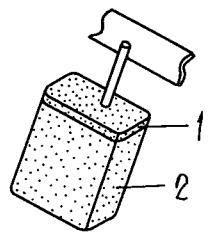
FIGS. 1(a) and (b) are perspective views showing part of the conventional method for manufacturing a solid electrolyte condenser.
Figure 1B:
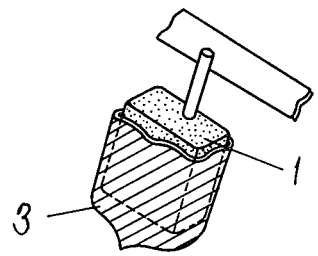
Figure 2:
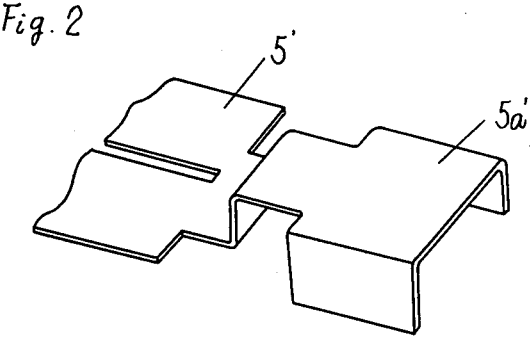
FIGS. 2, 3, 4 and 5 are perspective views showing steps of a method for manufacturing a chip-like solid electrolyte condenser according to one embodiment of this invention.

In the first place, as shown in FIG. 2, a condenser element 6 is disposed between the respective tips of the anode terminal pieces 4' and the cathode terminal pieces 5' which are held in abutment. At this time, the anode and cathode terminal pieces 4' and 5' should be positioned above the condenser element 6 with a U-shaped connecting area 5a' of the cathode terminal piece 5' engaged over the condenser element 6.

Figure 3:
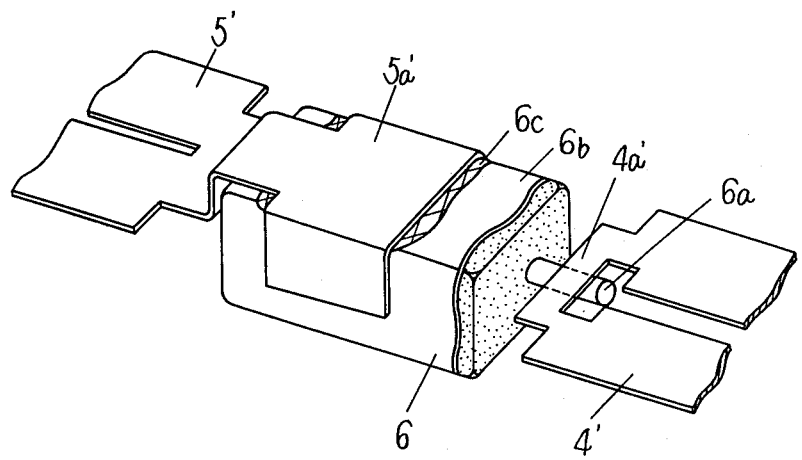

Subsequently, as shown in FIG. 3, an anode lead-out line 6a of the condenser element 6 and a connecting area 4a' of the anode terminal piece 4' are welded together and, also, the connecting area 5a' of the cathode terminal piece 5' is connected to a cathode current collecting layer 6b on the condenser element 6 by means of a solder layer 6c formed on a portion of the cathode current collecting layer 6b.

At the time the connecting area 5a' of the cathode terminal piece 5' is to be connected to the cathode current collecting layer 6b by means of the solder layer 6c, the cathode terminal piece 5' is heated and, in addition, the connecting 5a' is pressed towards the condenser element 6. This pressing is preferred to be continued until the solder solidifies.

Figure 4:
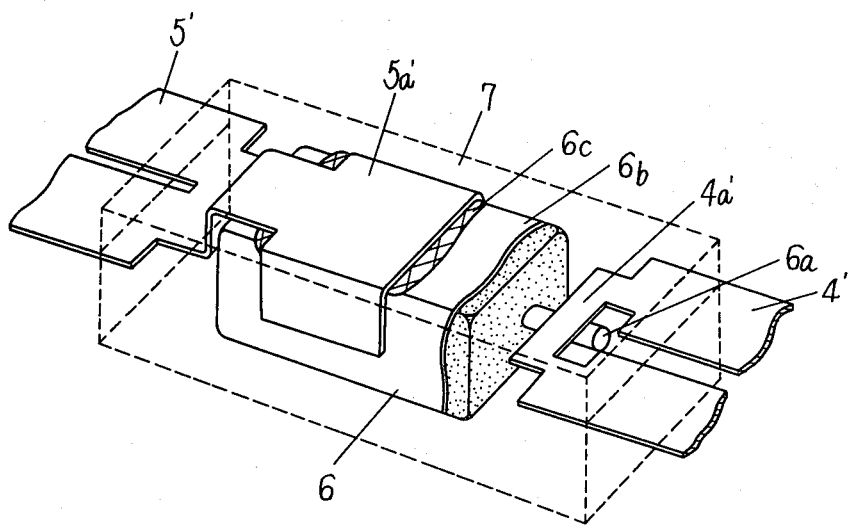
Figure 5:
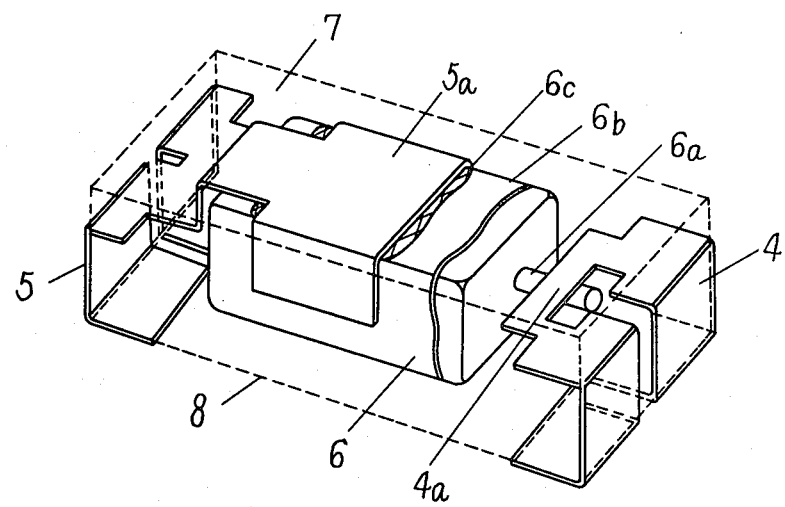

Subsequently, by encapsulating to cause the condenser element 6 including portions of the anode and cathode terminal pieces 4' and 5' to be molded with an insulating resin 7 as shown by the broken line in FIG. 4, then cutting the anode and cathode terminal pieces 4' and 5' at predetermined positions and finally bending them along an end face and a bottom surface of the condenser body 8 to provide the anode and cathode terminals 4 and 5, the chip-like solid electrolyte condenser shown in FIG. 5 can be obtained. It is to be noted that reference numerals 4a' and 5a' designate the connecting areas.

Hereinafter, a method for forming the solder layer 6c partially on the cathode current collecting layer 6b on the condenser element 6 will be described.

To begin with a first method, although a solderable silver paint, for example, #4929 (commercial name) of Du'Pont of U.S.A., has long been used as the cathode current collecting layer of the solid electrolyte condenser, these silver paints can be solderable, but any solder fails to attach to a silver paint layer when dipped into a solder bath without using a flux. That is, soldering by to a dipping method, even though solderable silver paint is used, is not effective.

Thus, by applying a flux only to a portion where soldering and a soldered coat are required, it is possible to form the solder layer only on that portion.

Since a solvent for the flux is an organic solvent such as xylene, bulyl acetate or methyl Cellosolve, it exhibits a good permeability and, also, a good affinity for the silver paint and, therefore, even though a portion is dipped into a flux solution, the flux adheres to the total surface.

In view of the above, where the flux is to be applied, the flux of isopropyl alcohol type is first caused to impregnate a porous material such as glass fibers, brushes, sponge or cotton and, then, the porous material is caused to contact to a portion of the silver paint layer on the condenser element. By so doing, flux can accurately be applied and limited to where soldering is required.

Steps of this method are shown in FIGS. 6(a) to 6(d) and, in these figures, reference numeral 9 designates a silver paint layer, reference numeral 10 designates a flux, reference numeral 11 designates a solder bath, and reference numeral 12 designates a solder layer.

A second method will now be described. This second method is a method wherein the cathode current collecting layer is constituted by a non-solderable silver paint and the solderable silver paint, the solderable silver paint being applied to a portion which forms the solder layer, and that portion is dipped into a solder bath after having been applied with the flux over the entire surface of the cathode current collecting layer. That is, according to this method, the solder layer can be formed only on the solderable silver paint. The solderable silver paint utilizeable in this method includes, for example #4922 (commercial name) and #4929 (commercial name) of Du'Pont of U.S.A. whereas the non-solderable silver paint includes, for example, #5504 (commercial name) and #6838 (commercial name) of Du'Pont of U.S.A.

With these two methods, it is possible to provide the solder layer only on the necessary portion.

Although in the foregoing description, silver paint has been described as used for the cathode current collecting layer, other than silver paint need be used. Moreover, even the flux may not be limited to that in the above described embodiment.

The following table illustrates the results of tests in which the chip-like solid electrolyte condensers made by the manufacturing method of this invention and the conventional chip-like solid electrolyte condensers were examined as to breakage and resin cracking resulting from the solder spattering by dipping the condensers into a solder bath, heated to 240° C., 260° C. and 280° C., for 5 seconds, 10 seconds, and 20 seconds. Each numerical value in the table represents the number of defective condensers/the number of test-pieces.

|  | Dipping Time | 240° C. | 260° C. | 280° C. |
|---|---|---|---|---|
| Conventional | 5 secs. | 10/50 | 13/50 | 35/50 |
| Invention |  | 0/49 | 1/50 | 6/50 |
| Conventional | 10 secs. | 15/49 | 21/50 | 41/50 |
| Invention |  | 0/50 | 3/50 | 7/50 |
| Conventional | 20 secs. | 20/50 | 23/50 | 42/50 |
| Invention |  | 0/50 | 2/50 | 6/50 |

As stated above, with the manufacturing method of this invention, a chip-like solid electrolyte condenser having an excellent heat resistance and free from any possible spattering of the solder used in connection with the cathode terminal, which would occur when dipped into the solder bath of 250° C., and from any breakage or defect in appearance can be obtained.

In addition, in the manufacturing method of this invention, by heating the cathode terminal while pressed towards the condenser element at the time the cathode terminal is to be connected to the cathode current collecting layer, it is possible to connect the cathode terminal with no fault and, also, with no formation of any unnecessary space between the cathode terminal and the condenser element, and an advantage can be appreciated in the minimization in size.

In addition, although the foregoing description has been made in connection with the chip-like solid electrolyte condenser, it may equally apply to other types of solid electrolyte condensers. Specifically, even in a solid electrolyte condenser encapsulated by dipping or encapsulated by molding and wherein a lead line is used as each of the anode and cathode terminals, the recent trend is that the soldering condition becomes strict and the occasion is increasing wherein the body of a condenser is, after the lead lines have been inserted through perforations in a printed circuit board, forced to directly contact the printed circuit board. Because of this, the demand has increased to make this type of solid electrolyte condenser have a heat resistance comparable to that of the chip-like solid electrolyte condenser.

Figure 7:
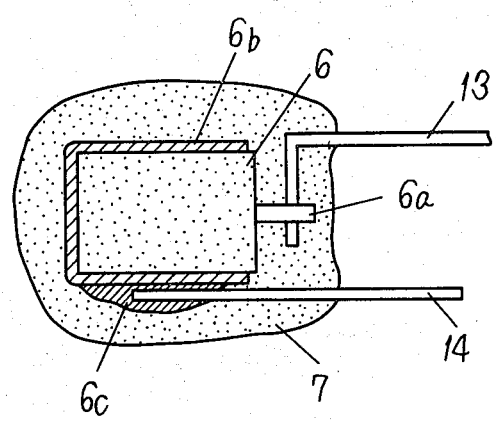
FIG. 7 is a sectional view showing a dip-type solid electrolyte condenser according to another embodiment of this invention.
Figure 8:
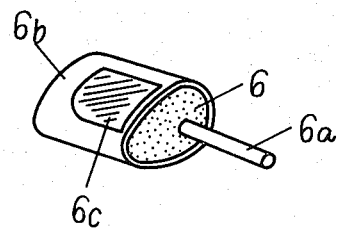
FIG. 8 is a perspective view showing a condenser element of the same condenser.

An embodiment in which this invention is applied to this type of solid electrolyte condenser is shown in FIGS. 7 and 8 wherein reference numeral 13 designates an anode lead line and reference numeral 14 designate a cathode lead line. In this embodiment, the solder layer 6c is partially formed on the cathode current collecting layer 6b on the condenser element 6 which is to be connected with the cathode lead line 14, and the cathode lead line 14 is connected by remelting and solidifying the solder layer 6c while the cathode lead 14 is in contact with the solder layer 6c.

INDUSTRIAL APPLICABILITY

As hereinbefore described, since the method for manufacturing the solid electrolyte condenser according to this invention is such that the solder layer is partially formed on the cathode current collecting layer to be connected with the cathode terminal and the cathode terminal is then connected by remelting and solidifying the solder layer while contacting the solder layer, there is neither any possible breakage of a weak area of the encapsulating resin nor any possible spattering of the solder from the surface of the boundary between the cathode terminal and the encapsulating resin, even when the solder layer connecting the cathode terminal and the cathode current collecting layer undergoes a thermal expansion and, therefore, the solid electrolyte condenser having an excellent heat resistance and free from any breakage, resin cracking or defect in appearance even when dipped into the solder bath of high temperature during the soldering to the circuit board, can be obtained.

I claim:

1. A method of manufacturing a solid electrolyte condenser, comprising the steps of:
   a. providing a condenser element which includes a layer of semiconductor metal, a cathode layer and a cathode current collecting layer sequentially deposited on an anode body having an anode lead-out line and a surface having a dielectric oxide film thereon;
   b. forming a solder layer on a portion less than the whole of said cathode current collecting layer by applying a flux to said portion and subsequently dipping the condenser element into a solder bath;
   c. remelting and subsequently solidifying the solder layer while contacting the solder layer with a cathode terminal so as to connect the cathode terminal to the cathode current collecting layer;
   d. connecting an anode terminal to the anode lead-out line; and
   e. encapsulating the condenser element after the anode and cathode terminals are respectively connected to the anode lead-out line and the cathode current collecting layer.

2. A method as defined in claim 1, wherein the step of remelting and solidifying includes the step of melting the solder layer by heating the side of the cathode terminal and applying the heated cathode terminal to the solder layer.

3. A method as defined in claim 1, wherein the flux is applied by contacting a porous material impregnated with the flux to the portion where the solder layer is to be formed.

4. A method as defined in claim 2, wherein the step of remelting and solidifying includes the step of pressing the cathode layer against the condenser element during the heating.

5. A method of manufacturing a solid electrolyte condenser, comprising the steps of:
   a. providing a condenser element which includes three layers, including
      (1) a layer of semiconductor metal,
      (2) a cathode layer, and
      (3) a cathode current collecting layer formed of a solderable electroconductive portion and a non-solderable electroconductive portion, sequentially deposited on an anode body having an anode lead-out line and a surface having a dielectric oxide film thereon;
   b. forming a solder layer on a portion less than the whole of said cathode current collecting layer by applying a flux to the whole of said cathode current collecting layer and subsequently dipping the condenser element into a solder bath to form the solder layer on the solderable portion of the cathode current collecting layer;
   c. remelting and subsequently solidifying the solder layer while contacting the solder layer with a cathode terminal so as to connect the cathode terminal to the cathode current collecting layer;
   d. connecting an anode terminal to the anode lead-out line; and
   e. encapsulating the condenser element after the anode and cathode terminals are respectively connected to the anode lead-out line and the cathode current collecting layer.

6. A method as defined in claim 5, wherein the step of remelting and solidifying includes the step of melting the solder layer by heating the side of the cathode terminal and applying the heated cathode terminal to the solder layer.

7. A method as defined in claim 6, wherein the step of remelting and solidifying includes the step of pressing the cathode layer against the condenser element during the heating.

* * * * *